United States Patent [19]

Harford et al.

[11] 3,811,625

[45] May 21, 1974

[54] MAGNETIC TAPE CASSETTE CHANGER

[75] Inventors: James W. Harford, Woodland Hills; Stuart W. Jeffries, Simi, both of Calif.

[73] Assignee: Cybrix Corporation, Chatsworth, Calif.

[22] Filed: Mar. 16, 1972

[21] Appl. No.: 235,204

[52] U.S. Cl. ........................................... 242/181

[51] Int. Cl. ............................................. G11b 5/00

[58] Field of Search ................ 274/4 F, 10 C, 10 D; 353/118; 179/100.2 Z; 214/1 NQ

[56] References Cited

UNITED STATES PATENTS

| | | | |
|---|---|---|---|
| 3,484,055 | 12/1969 | Raine | 274/4 F |
| 3,643,962 | 2/1972 | White et al. | 274/4 F |
| 3,612,432 | 10/1971 | Johnson | 274/4 E |
| 3,174,395 | 3/1965 | Krull | 353/118 |
| 3,667,624 | 6/1972 | Ogura | 242/181 |
| 3,501,153 | 3/1970 | Osborne | 274/10 C |

*Primary Examiner*—Harry N. Haroian
*Attorney, Agent, or Firm*—Nilsson, Robbins & Berliner

[57] ABSTRACT

A cassette selector or changer is disclosed for operation with a plurality of cassettes and a magnetic tape deck. A holder for cassettes is mounted for movement to a position at which a selected cassette may be grasped by a cassette-engaging structure. A drive (incorporating a geneva movement and an axial cam) rotates to move the engaging structure so as to transport the cassette along a multiple-dimensional path between the tape deck and the holder. A locking structure completes the engagement between the cassette and the tape deck, holding the cassette engaged during operation. The elements as described above are controlled to accomplish an operating sequence whereby a predetermined program involving several cassettes may be selectively executed.

9 Claims, 7 Drawing Figures

MAGNETIC TAPE CASSETTE CHANGER

BACKGROUND AND SUMMARY OF THE INVENTION

The prolonged research effort to provide improved recording structures, as for sound recordings, has now produced the magnetic-tape cassette. Generally, such cassettes include two rotary spools (for receiving drive spindles) mounted in a flat parallelepiped box along with a considerable length of magnetic tape for movement between the two rotary spools. Conventionally, such cassettes engage a player or tape-deck apparatus which includes drive spindles and transducer heads. The spindles revolve the spools to drive the tape over the transducer heads which engage the tape so as to sense and record signal-represented information.

Cassette players are well known and in one form receive a single cassette for operation with that cassette. Additionally, it has been previously proposed to provide a structure for receiving a stack of cassettes, which structure would play the cassettes in the sequence of the stack. In addition to the above structures and in accordance herewith, a need has been recognized for an apparatus that is capable of accessing recorded signals from a plurality of individual cassettes in any predetermined order. That is, it may be desirable to play a particular group of cassettes in various predetermined sequences without physical re-arrangement, to provide a program of recorded signals from a group of cassettes in any predetermined random order. Accordingly, a need exists for an apparatus that is capable of selectively providing recorded signals in a random fashion from magnetic tape cassettes. The applications for such an apparatus vary and include home entertainment, radio broadcasting, coin-operated machine applications and so on.

In general, the present invention comprises an economical, reliable and durable apparatus for use with a plurality of magnetic tape cassettes, to select and operate such cassettes so as to satisfy a predetermined program which is randomly composed with respect to signals carried on the cassettes. More specifically, the cassettes are provided on a holder in such a manner as to be individually accessible to a transport structure that is capable of grasping a selected cassette for movement along a two-dimensional path from the holder to a tape deck. The mechanism of the transport, the tape deck and the holder are controlled in a sequence of operations to enable accomplishment of a predetermined operating program.

BRIEF DESCRIPTION OF THE DRAWINGS

In the drawings, which constitute a part of this specification, exemplary embodiments exhibiting various objectives and features hereof are set forth, specifically.

DESCRIPTION OF THE ILLUSTRATIVE EMBODIMENT

As required, a detailed illustrative embodiment of the invention is disclosed herein. The embodiment exemplifies the invention which may, of course, be embodied in various other forms, some of which may be radically different from those disclosed herein. However, the specific structural and functional details disclosed herein are representative and provide a basis for the claims herein which define the scope of the invention.

Figure 1:
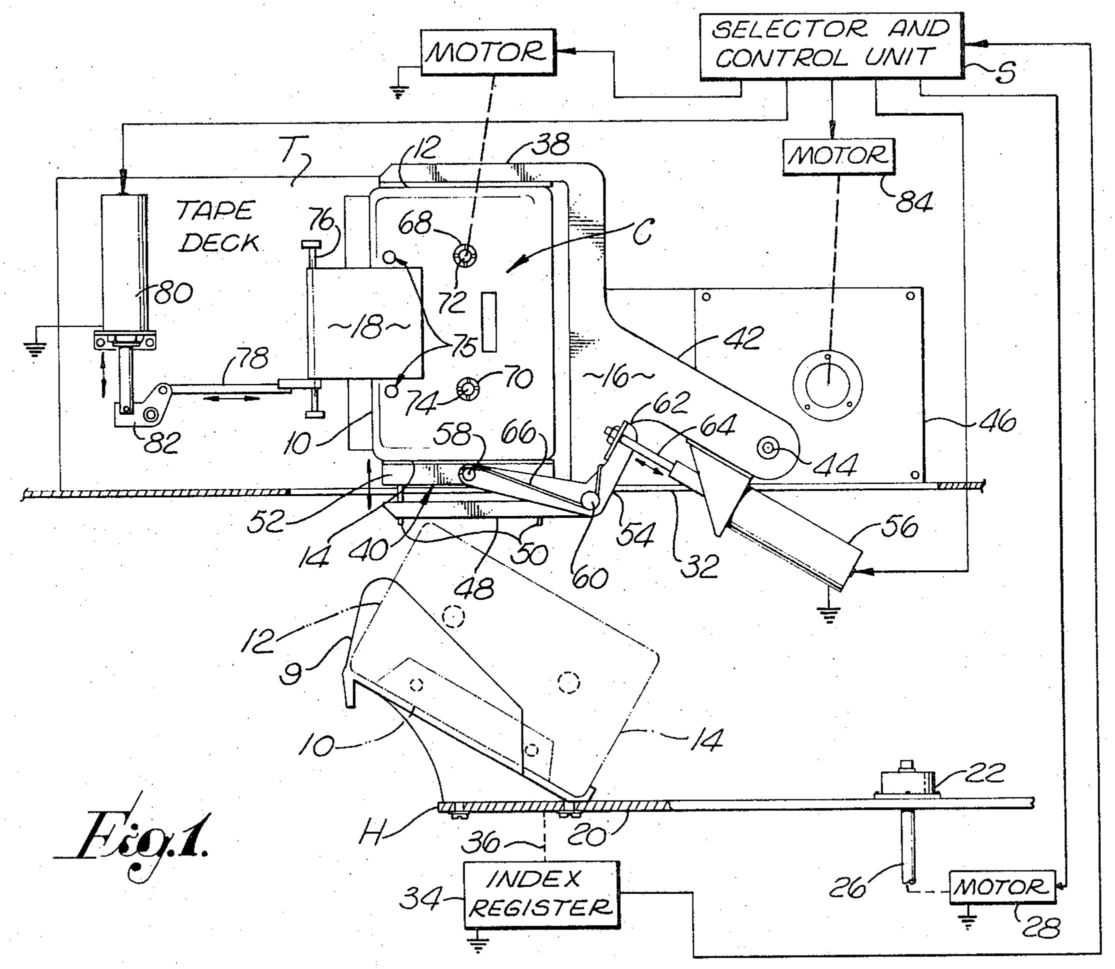
FIG. 1 is a somewhat-sectionalized side elevation and block diagram of a system incorporating the present invention.
Figure 2:
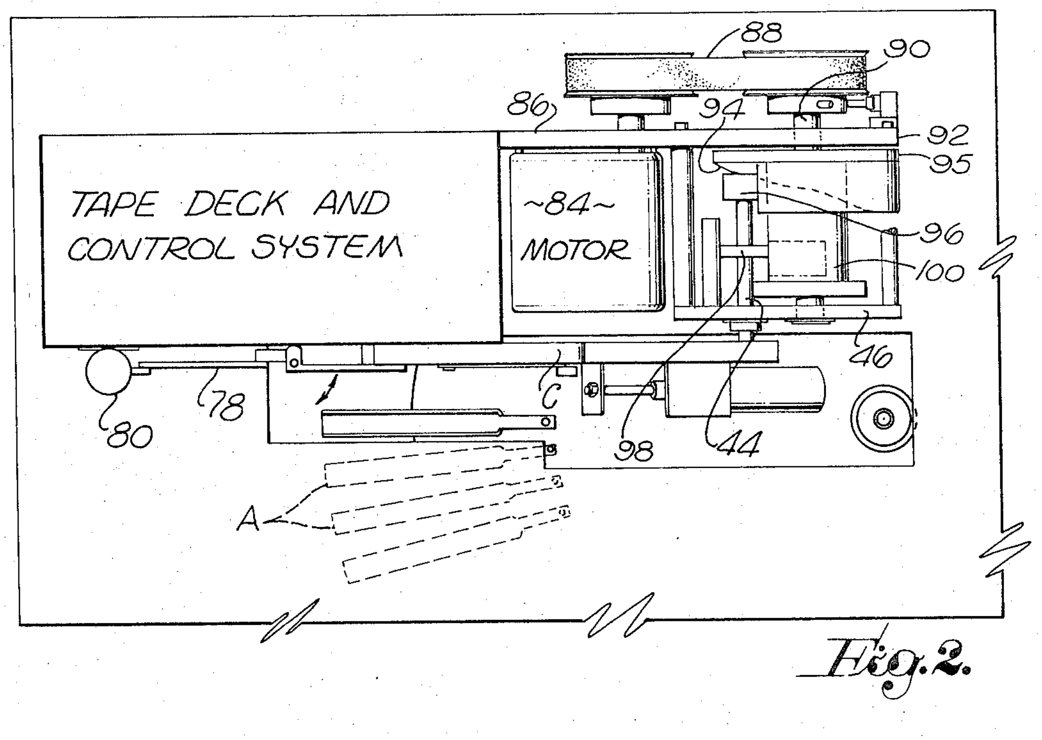
FIG. 2 is a fragmentary plan view of the mechanism as depicted in FIG. 1.

Referring initially to FIG. 1, there is shown a selected cassette C in playing position with reference to a tape deck T. Other cassettes A (FIG. 2, indicated in phantom) are supported in a cassette holder H. Generally, the operation of the system involves selecting the predetermined cassette C from the holder H, transporting such cassette to an operative position with reference to the tape deck T obtaining the desired signal access then returning the cassette C to the holder H. These operations are controlled by an electrical system incorporating motors, solenoids, and a selector and control unit S.

In general, the individual cassettes C are carried in troughs 9 (FIG. 1) affixed on the holder H, so that the cassettes rest on a narrow side 10 with the ends 12 and 14 open and accessible. An engaging mechanism 16 (generally indicated in a raised position) clamps a selected cassette C by engagement with the ends 12 and 14, lifts the cassette through an arcuate path from the position indicated in phantom to a position adjacent the tape deck T, after which the mechanism 16 moves the cassette C along a short axially-parallel path (substantially at right angles to the plane of the arcuate path). The extent of the latter movement is sufficient to initiate engagement between the cassette C and the tape deck T; however, for final engagement, the cassette C is released by the mechanism 16 (to permit lateral motion) and moved into an operating position by a pivotally-mounted locking arm 18, above the transducer head.

Considering the structure of the disclosed embodiment in somewhat greater detail, the holder H is a rotary holder including a disk platform 20 concentrically supported by a hub 22 and coupled through a drive shaft 26 to a motor 28. The structure is supported on a frame member 30 which is continuous with a frame member 32 (upper structure) and accordingly the holder H is rigid with reference to the tape deck T and the mechanism 16.

The motor 28 is electrically connected to the selector and control unit S along with an index register 34 which also is coupled to the rotary holder H as indicated by a dashed line 36. The motor 28 is energized to move the desired cassette C in a position (indicated in phantom) to be grasped by the mechanism 16. The index register 34 is actuated by movement of the holder H so as to provide signals indicative of the instant position of the holder H so as to indicate accomplishment of the desired position. Generally, any of a variety of position-indicating linkages, utilizing magnetic, light, or electromechanical apparatus may be employed to actuate the register 34, as well known in the prior art.

When the desired cassette C has reached the desired position, the holder H stops and the ends 12 and 14 of that cassette are engaged by the jaws 38 and 40 of the mechanism 16. It is to be noted, that while the holder H is revolved to the desired position, the mechanism 16 is in the lowered position (described in greater detail below) in which the cassettes C carried in the holder H move freely between the jaws 38 and 40.

Considering the mechanism 16 in somewhat greater detail, a support arm 42 has one end (right) supported for pivotal movement on a shaft 44 which extends from a vertical support plate 46. At the opposite end (left) of the arm 42, the spaced apart parallel jaws 38 and 40 are supported at the ends of a section 47. The upper jaw 38 is rigid and integral with the section 47 and the arm 42; however, the lower jaw 40 includes an integral extension 48 which receives guide pins 50 extending from a parallel gripping beam 52. Gripping action is accomplished by movement of the gripping beam 52 through a bell crank 54, actuated by a solenoid 56. Specifically, one end (left) of the crank 54 is affixed to the beam 52 at a pivot 58, while the stationary pivot 60 of the crank is reference supported adjacent the extension 48. The other moving end 62 (right) of the crank 54 is connected by a rod 64 to the moving armature of the solenoid 56. Accordingly, when the solenoid 56 is actuated, the bell crank 54 lifts (as illustrated) the beam 52 to clampingly engage the cassette C in cooperation with the jaw 38. Upon deenergization of the solenoid 56, a spring 66 forces the beam 52 downward to release the cassette C. The solenoid 56, as indicated, is connected to the selector and control unit S which serves to energize the solenoid during the interval of moving a cassette C through a path between the tape deck T and the holder H.

As indicated, the final positioning movement of the cassette C to engage the tape deck T is accomplished by the locking arm 18. Specifically, at the termination of the motion pattern by the mechanism 16, the rotary drive spools 68 and 70 of the cassette C are positioned to just barely receive the drive spindles 72 and 74, respectively. The clamping hold of mechanism 16 on the cassette C is then released, and the arm 18 is pivotally moved to complete the engagement of spools 68 and 70 with the spindles 72 and 74.

The arm 18 is supported on a vertical pivot pin 76, the ends of which are affixed to the frame of the tape deck T. The arm 18 is moved in a swinging motion pattern through a linkage 78 by a solenoid 80, the linkage 78 including a crank 82. The solenoid 80 is electrically connected to the selector and control unit S so that upon energization, the solenoid (acting through the linkage 78) swings the arm 18 toward the tape deck T moving the cassette C into total engagement with the tape deck.

As indicated above, the motion pattern accomplished by the mechanism 16 extends in two directions. That is, the selected cassette C is lifted from the holder H vertically then translated horizontally to a position of preliminary engagement with the deck T. These motions are provided by a motor 84 (FIG. 2) which is supported by a frame member 86 and coupled through a pulley-belt apparatus 88 to a rotatably mounted shaft 90. The shaft 90 extends for support between a frame member 92 and the support plate 46. In the space between these support members, the shaft 90 drives a geneva movement and an axial cam. The cam surface 94 extends axially from a disk 95 (concentric with the shaft 90) which receives a cam follower 96 that is affixed to the sliding shaft 44, which supports the mechanism 16. The shaft 44 also receives a geneva element 98 for engagement with the shaft 90 through a fraction of a revolution by the geneva mechanism 100 as considered below in greater detail with reference to FIGS. 4 and 5.

Figure 4:
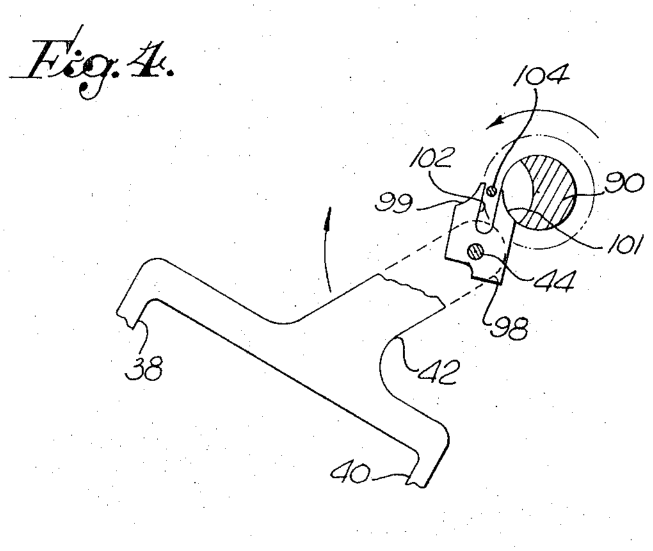
FIGS. 4 and 5 are fragmentary elevations illustrative of the operation of one mechanism embodied in the system of FIG. 1.
Figure 5:
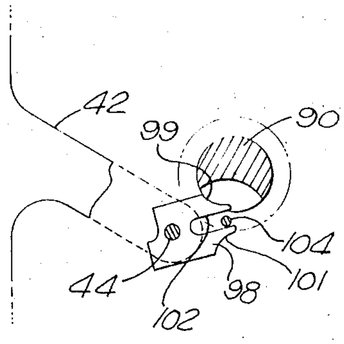
Figure 6:
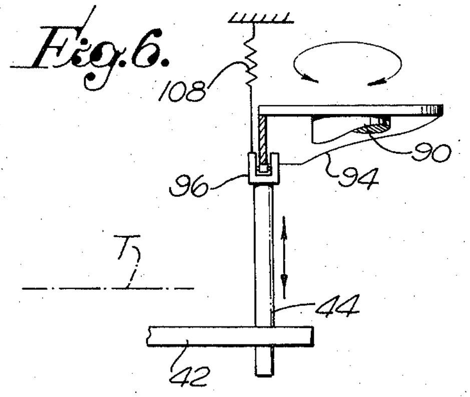
FIGS. 6 and 7 are fragmentary elevations illustrative of the operation of another mechanism embodied in the system of FIG. 1.
Figure 7:
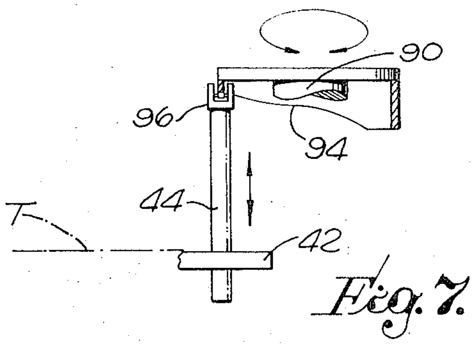

The two components of the motion pattern for the selected cassette C, as described above, occur sequentially. Specifically, in moving from the holder H, the arcuate motion (described below with reference to FIGS. 4 and 5) is followed by the translating motion (FIGS. 6 and 7). On the contrary, in moving from the tape deck T to the holder H, the motion pattern for the selected cassette C is initially the translating component (FIGS. 6 and 7), followed by the arcuate pattern (FIGS. 4 and 5).

The arm 42 (FIG. 4) is supported on the shaft 44 in fixed engagement with the element 98 and in a fixed angular relationship. The element 98 defines rider surfaces 99 and 101, plus a slot 102 for receivably engaging a pin 104 to turn the arm 42 through an arcuate path during one fragment of a revolution by the shaft 90. As indicated in FIG. 4, as the shaft 90 revolves in a counterclockwise direction, the pin 104 enters the slot 102 engaging the element 98 thereby swinging the arm 42 about the shaft 44, to raise the jaws 38 and 40 through an arcuate motion pattern. The pattern is terminated at the location as indicated in FIG. 5 at which the pin 104 exits from the slot 102 and the surface 99 mates with the surface of the shaft 90.

The reverse motion pattern (returning the cassette C to the holder H) is accomplished by the shaft 90 revolving in a clockwise direction. Specifically, from the position as illustrated in FIG. 5, the pin 104 engages the geneva element 98 to provide motion through the reverse arcuate pattern. That pattern is concluded with the elements positioned as depicted in FIG. 4; however with the shaft 90 revolving clockwise.

Considering the other component of the motion pattern, assume a motion pattern from the holder H to the tape deck T. The selected cassette C (after initially moving through the arcuate pattern as described with reference to FIGS. 4 and 5) is positioned for axial motion. As the shaft 90 continues to move in a counterclockwise direction from the position depicted in FIG. 5, the cam follower 96 (FIG. 6) engages the cam surface 94 moving the shaft 44 axially to translate the selected cassette toward the tape deck T. A spring 108 (symbolically represented) maintains the cam follower 96 in engagement with the cam surface 94 to accomplish the desired motion pattern. At the termination of the motion (FIG. 7) the shaft 44 has moved axially to a position in which the arm 42 is contiguous to the tape deck T.

Figure 3:
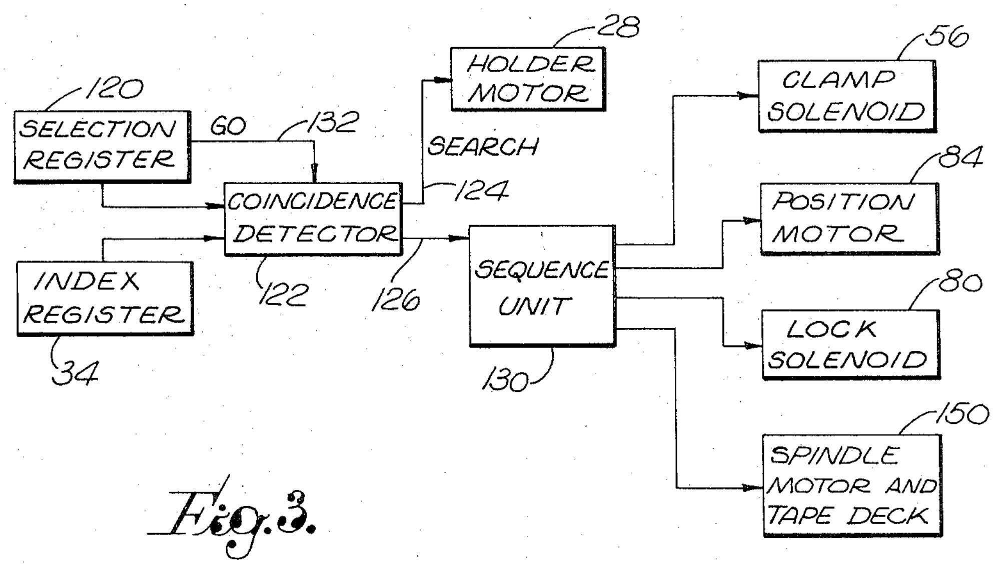
FIG. 3 is a block diagram representative of the electrical system of the apparatus of FIG. 1.

Reference will now be made to the block diagram of FIG. 3, representative of the electrical system. Generally, the initial step in a sequence of operation will involve the selection of a particular cassette or more specifically, positioning a desired cassette on the holder H between the lowered jaws 38 and 40. The selection may be specified by a number coinciding to a numbered location of the holder H, which number is registered in a selection register 120 as well known in the prior art. The selection register 120, along with the index register 34, is connected to a coincidence detector 122, various forms of which are well known in the prior art. Functionally, the coincidence detector 122 provides the high level of a binary signal to one of a pair of lines 124 or 126, depending upon whether or not the values in the registers 120 and 34 are identical. If the registered values are dissimilar, a high signal is provided in the conductor 124 to actuate the motor 28. On the contrary, when the contents of the registers 34 and 120 becomes identical, the detector 122 provides a high signal in the line 126 for actuating the sequence unit 130.

In view of the above preliminary description of the illustrative embodiment, primarily relating to physical structure, a complete understanding thereof may now be best accomplished by assuming a sequence of operation and explaining the resulting individual steps of such a sequence concurrently with the description of other elements. Recapitulating, upon registration of a designated cassette location in the register 120, the detector 122 is actuated by a signal that is supplied through a conductor 132, to determine whether or not the holder H is positioned to provide the selected cassette C. Normally, the holder will require some displacement, which event is manifest by the contents of the selection register 120 differing from the contents of the index register 34. That difference is detected by the detector 122 to energize the motor 28 thereby revolving the platform 20. Movement of the platform 20 is reflected in the index register 34, as described above, and in due course the contents of the register 34 is identical with the contents of the register 120. That event is sensed by the coincidence detector 122 to deenergize the motor 28 and energize the sequence unit 134.

With the selected cassette C positioned between the jaws 38 and 40 of the mechanism 16, the initial step in the sequence, as controlled by the unit 130, is to actuate the solenoid 56 (FIG. 1) causing the mechanism 16 to grip the selected cassette C. The sequence unit 130 (FIG. 3) maintains the solenoid 56 energized until the desired movement of the mechanism 16 is completed.

Upon engagement of the selected cassette C by the mechanism 16, the sequence unit 130 next actuates the transport motor 84 which energizes the shaft 90 (FIGS. 4, 5, 6 and 7) to raise the cassette through an arcuate path then translate it to a position as illustrated in FIG. 1 contiguous to the tape deck T. Essentially, the motor 84 is a single-revolution unit which alternately automatically revolves in clockwise and counterclockwise directions.

Upon completion of its rotation, the motor 84 is deenergized, leaving the selected cassette C in a position so that the spools 68 and 70 (FIG. 1) are partially engaged with the tape-deck spindles 72 and 74. In that position, the sequence unit 130 (FIG. 3) next functions to deenergize the solenoid 56 thereby releasing the grip of the mechanism 16 on the cassette C. With the cassette C so released, the solenoid 80 is next energized causing the pivotal arm 18 (FIG. 1) to move inwardly thereby forcing the cassette C into full engagement with the tape deck. It is to be noted that the final engagement of the cassette C with the drive spindles 72 and 74 of the tape deck is provided by a motion pattern which permits the cassette C to move radially in relation to the spindles 72 and 74. Consequently, final alignment allows locator pins 75 to receive the cassette upon engagement between the spindles 72 and 74 and the spools 68 and 70.

With the cassette C in position, the sequence unit 130 (FIG. 3) provides a signal to the spindle motor and tape deck structure 150, the details of which are ancillary to the present invention; however, various forms of which are well known in the prior art. That is, with the cassette C in an operating position in relation to the tape deck T, the tape deck functions to select the desired tape location and perform the desired operation (sense or record) in relation to the tape.

At the conclusion of the desired operation for the tape in the cassette C, the lock solenoid 80 (FIG. 1) is first deenergized after which the clamp solenoid 56 is energized whereby the cassette C is again engaged by the mechanism 16 gripping the cassette between the ends 12 and 14. The position motor 84 is then energized to accomplish a revolution of the shaft 90 (FIG. 2) in a clockwise direction (FIGS. 4, 5, 6 and 7) causing the cassette to initially be moved axially in relation to the spools 68 and 70, then through a somewhat-perpendicular arcuate pattern returning the cassette C to the holder H. At the conclusion of a revolution by the shaft 90, the motor 84 is again deenergized as is the solenoid 56 thereby releasing the cassette C. Thus, the system is restored to a quiescent state which may endure or may be followed by the selection of another cassette to be transported into an operating location as described in detail above.

In view of the above explanation, it will be apparent to those skilled in the art, that various specific mechanisms may be employed to implement the present system in accordance herewith. Accordingly, it is to be appreciated that the scope hereof shall be in accordance with the claims as set forth below.

What is claimed is:

1. A selector, as for use with a plurality of cassettes housing magnetic tape and including reels with central rotary drives and along with a tape deck including drive spindles to be received in said central rotary drives to move said magnetic tape, comprising:
   - a cassette holder for supporting a plurality of said cassettes;
   - engaging means for clampingly engaging a selected cassette in said holder;
   - drive means coupled to said engaging means to move said engaging means along a path perpendicular to the axes of said rotary drives for transporting said selected cassette between said cassette holder and a position contiguous to said tape deck;
   - locking means to engage said selected cassette contiguous to said tape deck, for locking said selected cassette to said tape deck such that said drive spindles engage said spindle drives; and
   - control means for sequencing the operation of said engaging means, said drive means and said locking means.

2. A selector according to claim 1 wherein said cassette holder includes means for moving said cassettes thereon in relation to said engaging means.

3. A selector according to claim 2 wherein said engaging means includes a clamp means for clampingly engaging said selected cassette between surfaces thereof which extend parallel to the axis of said spindle drives.

4. A selector according to claim 1 wherein said drive means includes means for moving said engaging means along paths extending in two dimensions.

5. A selector according to claim 4 wherein said drive means includes a rotary shaft, a pin affixed to said shaft to extend parallel thereto for moving said engaging means in an arcuate path, and an axial cam affixed to said shaft for moving said engaging means perpendicular to the plane of said arcuate path.

6. A selector according to claim 1 wherein said drive means moves said selected cassette to a location in which said spindle drives are somewhat aligned with said drive spindles and wherein said locking means includes means for moving said selected cassette axially of said drive spindles.

7. A selector according to claim 6 wherein said cassette holder includes means for moving said cassettes thereon in relation to said engaging means and wherein said engaging means includes a clamp means for clampingly engaging said selected cassette between surfaces thereof which extend parallel to the axis of said spindle drives.

8. A selector according to claim 7 wherein said drive means includes means for moving said engaging means along paths extending in two dimensions.

9. A selector according to claim 1 wherein said control means includes means for sensing a predetermined position of said holder.

* * * * *